US010303706B2

(12) United States Patent
Harten

(10) Patent No.: US 10,303,706 B2
(45) Date of Patent: May 28, 2019

(54) CONDENSED HIERARCHICAL DATA VIEWER

(71) Applicant: William Scott Harten, Woods Cross, UT (US)

(72) Inventor: William Scott Harten, Woods Cross, UT (US)

( * ) Notice: Subject to any disclaimer, the term of this patent is extended or adjusted under 35 U.S.C. 154(b) by 630 days.

(21) Appl. No.: 14/554,839

(22) Filed: Nov. 26, 2014

(65) Prior Publication Data
US 2015/0149466 A1 May 28, 2015

Related U.S. Application Data

(60) Provisional application No. 61/909,485, filed on Nov. 27, 2013.

(51) Int. Cl.
*G06F 16/28* (2019.01)

(52) U.S. Cl.
CPC .......... *G06F 16/287* (2019.01); *G06F 16/282* (2019.01)

(58) Field of Classification Search
CPC ........ G06F 17/30327; G06F 17/30625; G06F 17/30961; G06F 16/282; G06F 16/287; G06F 16/288; G06T 11/60
See application file for complete search history.

(56) References Cited

U.S. PATENT DOCUMENTS

| 5,339,385 | A | * | 8/1994 | Higgins | .................. | G10L 17/08 |
| | | | | | | 704/246 |
| 6,092,065 | A | * | 7/2000 | Floratos | ............ | G06F 17/30985 |
| | | | | | | 382/161 |
| 9,430,583 | B1 | * | 8/2016 | Flake | .................. | G06F 17/3092 |
| 9,710,815 | B2 | * | 7/2017 | MacIntyre | ............. | G06Q 30/02 |
| 2002/0026471 | A1 | * | 2/2002 | Bent | ....................... | H04L 67/02 |
| | | | | | | 718/101 |
| 2003/0023715 | A1 | * | 1/2003 | Reiner | .................... | G06F 11/32 |
| | | | | | | 709/224 |
| 2004/0133555 | A1 | * | 7/2004 | Toong | ............... | G06F 17/30014 |
| 2004/0172347 | A1 | * | 9/2004 | Barthel | .................. | G06Q 10/10 |
| | | | | | | 705/31 |
| 2004/0239674 | A1 | * | 12/2004 | Ewald | ................. | G06F 17/2247 |
| | | | | | | 345/440 |
| 2005/0080757 | A1 | * | 4/2005 | Sharma | ............. | G06F 17/30507 |

(Continued)

OTHER PUBLICATIONS

NPL "XML: Your Visual Blueprint for Building Expert Websites with XML, CSS, XHTML, and XSLT", 2008, Wiley Publishing.*

*Primary Examiner* — Jau Shya Meng
*Assistant Examiner* — Huen Wong
(74) *Attorney, Agent, or Firm* — Terrence J. Edwards; TechLaw Ventures, PLLC

(57) ABSTRACT

The disclosure extends to methods, systems, and devices for visualizing hierarchical data within a computing environment. In order to display and visualize the hierarchical data in a meaningful manner, the disclosed methods condenses or suppresses the space occupied by the detailed textual information that is often part of such hierarchical data charts or graphs. The disclosure uses pop-up windows to output the formerly suppressed textual detail. Thus, in order to efficiently display more entities per unit display space, the disclosure displays less textual detail per node for all entities in the chart or graph, and compensates by using mouse over pop-up events to display the suppressed, hidden, or compressed details.

33 Claims, 7 Drawing Sheets

(56) References Cited

U.S. PATENT DOCUMENTS

| | | | |
|---|---|---|---|
| 2005/0147947 A1* | 7/2005 | Cookson, Jr. | G06F 17/30327 434/154 |
| 2005/0171760 A1* | 8/2005 | Tinkler | G06F 17/2795 704/10 |
| 2006/0075335 A1* | 4/2006 | Gloor | G06T 11/206 715/273 |
| 2006/0106847 A1* | 5/2006 | Eckardt, III | G06F 17/30696 |
| 2007/0143321 A1* | 6/2007 | Meliksetian | G06F 17/30917 |
| 2007/0266003 A1* | 11/2007 | Wong | G06Q 90/00 |
| 2007/0288465 A1* | 12/2007 | Aggarwal | G06Q 10/00 |
| 2008/0052298 A1* | 2/2008 | Yeh | G06F 17/30908 |
| 2008/0172407 A1* | 7/2008 | Sacks | G06Q 10/10 |
| 2012/0218289 A1* | 8/2012 | Rasmussen | G06T 11/206 345/619 |
| 2013/0097487 A1* | 4/2013 | Alli | G06F 17/2247 715/239 |
| 2013/0167088 A1* | 6/2013 | Mangum | G06F 3/0488 715/815 |
| 2014/0278138 A1* | 9/2014 | Barber | G06F 19/14 702/19 |

* cited by examiner ial Application No. 61/909,485 filed Nov. 27, 2013, which is hereby incorporated by reference herein in its entirety, including but not limited to those portions that specifically appear hereinafter. The incorporation by reference being made with the following exception: in the event that any portion of the above-referenced provisional application is inconsistent with this application, this application supersedes said above-referenced provisional application.

BACKGROUND

A variety of visualization techniques have been developed and are widely used for portraying relational hierarchical data. As an ever increasing amount of hierarchical data is made available from a multitude of distributed databases connected over the internet, a demand for efficient and visually distinctive ways for portraying large hierarchical data sets has developed. Accordingly, what is needed is a display space efficient and visually intuitive computer based method and system for interactively portraying hierarchical data to a user.

SUMMARY OF THE DISCLOSURE

The disclosure relates generally to the handling and visualization of hierarchical data entities, and more specifically to condensed and efficient visualization of relational hierarchical data entities and corresponding relationships. Disclosed herein below are methods and systems for portraying large sets of hierarchical data over a computer network to a user that is both band-width efficient and visually intuitive. Additionally, the methods and systems disclosed herein provide for the basis of an improved interactive hierarchical data viewer over prior art viewers because of the efficiency and intuitiveness provided.

The features and advantages of the disclosure will be set forth in the description, which follows, and in part will be apparent from the description, or may be learned by the practice of the disclosure without undue experimentation. The features and advantages of the disclosure may be realized and obtained by means of the instruments and combinations particularly pointed out in the appended claims. Any discussion of documents, acts, materials, devices, articles or the like, which has been included in the specification is not to be taken as an admission that any or all of these matters form part of the prior art base, or were common general knowledge in the field relevant to the disclosure as it existed before the priority date of each claim of this disclosure.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
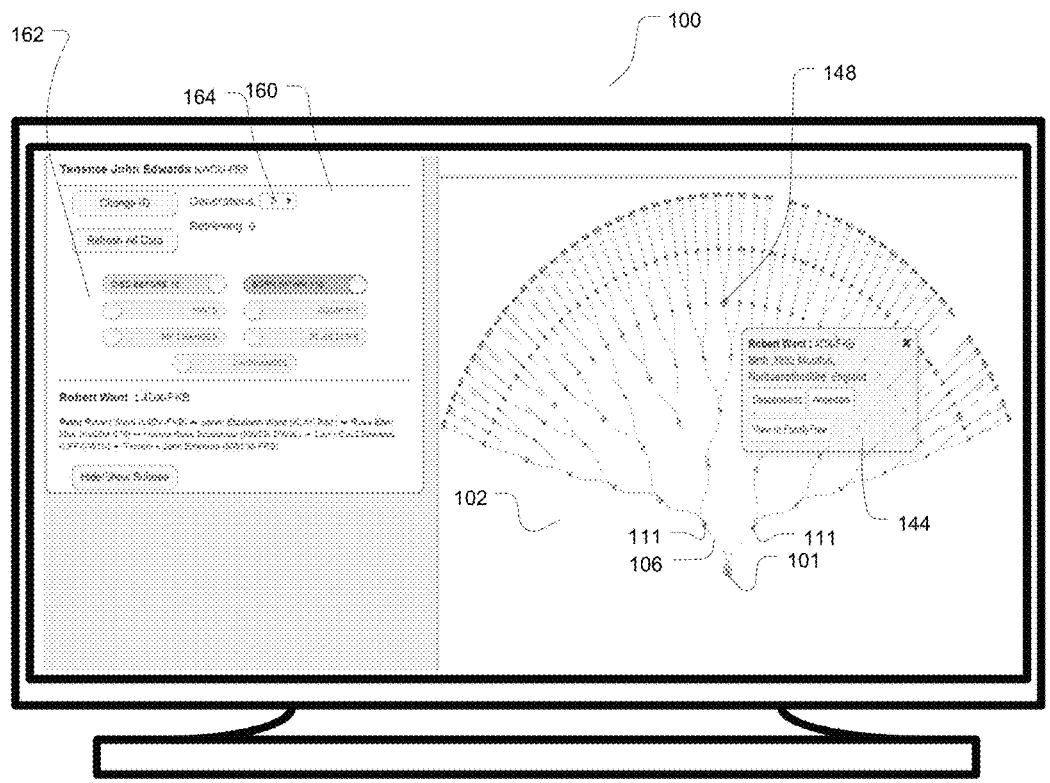
FIG. 1 illustrates an implementation of a condensed hierarchical data viewer on a digital display in accordance with the teachings and principles of the disclosure.

The disclosure extends to methods and systems for providing hierarchical data in an efficient and condensed manner that will utilize current display technology to the fullest. The disclosure extends to methods and systems for visualizing hierarchical data within a computing environment. In order to display and visual the hierarchical data in a meaningful manner, the disclosure condenses or sacrifices the space required by detailed textual property information that is often part of such hierarchical data charts or graphs. The disclosure uses pop-up windows to gain back the detailed text. Thus, in order to efficiently display more entities per unit display space, the disclosure displays less detail per node for all entities in the chart or graph and compensate by using a mouse over pop-up to display suppressed, hidden, or compensated details.

In the following description of the disclosure, reference is made to the accompanying drawings, which form a part hereof, and in which is shown by way of illustration specific implementations in which the disclosure may be practiced. It is understood that other implementations may be utilized and structural changes may be made without departing from the scope of the disclosure.

Before the methods, systems and devices for producing a portraying hierarchical data are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the term "glyph" refers to a symbol that conveys information nonverbally. For example, a glyph may be used to represent a data entity within a digital rendering wherein characteristics of the glyph may correspond to properties of the digital entity that the glyph portrays. For example, a data entity may be an adult male who is single, a non-smoker, veteran of Afghanistan, college educated, and has children. Portraying all of these properties for this data entity may seem rather strait forward and may take relatively little screen space on a digital display, however when it comes to portraying hundreds and thousands of similar data entities that are all contextually relevant (such as relatives and within organizations) to some if not all of the other data entities to be shown a chart. Textual portrayal of properties would very quickly over run available display space and turn the chart into a useless mass of text. Alternatively, glyphs may be use to represent data entities and various properties of the each of the data entities may be shown in the characteristics assigned to the representative glyph.

As used herein, the term "tree" refers broadly to an undirected graph in which any two vertices are connected by exactly one path. A tree of a graph is a subset of a graph that forms a tree and that represents a view or perspective of the graph beginning with a single starting node, referred to as the root of the tree, and then visiting and including each edge and related node from the starting node to adjacent nodes, and from adjacent nodes to their adjacent nodes, etc., continuing as far as desired to view or interact with information of interest that is available in the graph. Edges may be unlabeled, representing relationships that are all of the same kind, such as the relation between a parent and a child in a genealogical pedigree or descendant chart where the same relationship is depicted by all edges in the graph. Alternatively, edges may be labeled to represent types of relations between data entities, such as the relation between bank and borrower, bank and lender (depositor), bank and employee, bank and regulatory agency. In this example, borrower, lender, employee and regulatory agency are labels indicating the type of relationship between the two entities. A database consisting of many tables, fields, records, and relationships between records is an example of graph with labeled relationships, where the relationship between an entity and a field is a labeled edge and the relation between one record and another is also a labeled edge.

As will be appreciated by those skilled in the art, allowing for the flexible nature of edges in an implementation, a system for visualizing a hierarchical chart, such as a genealogical chart as an example, that depicts relationships that are all the same type, can function equally well for a database having various types of relationships between its tables, joins, fields, etc., and can be graphically rendered for efficiency.

As used herein, visualizing and/or rendering a graph means drawing a picture of the graph on a computer screen, paper, or other two-dimensional surface so that a person viewing the graph can better perceive the information in the graph or a subset of it. A graphic visualization (view) may typically be drawn or rendered using symbols to represent nodes connected by lines to represent edges.

As used herein, interacting with a graph may mean selecting nodes and edges of the graph to perform operations on selected elements and manipulate the graph and change the visualization, to change the information, and to initiate actions or to perform other activities involving the graph and its components.

As used herein, the term "property" or "properties" refer broadly to characteristics of a data entity which may be items of specific interest and may be fields, attributes, or other properties to display to a user.

A fundamental challenge, when creating meaningful visualizations, is constraining the drawing within the available limited digital display space, while maintaining pertinent information, such as the nodes and edges that make up the tree. As the number of data entities increase and as their respective relations increase, each relation includes an edge and its corresponding nodes, resulting in ever less display space per digital entity. For most large data applications space is at a premium, and a balance bust be found for the tradeoff between the size allocated for drawing each relation versus the number of relations that can be included in a view of a fixed or static digital display.

Another challenge is to convey information to a human viewer rapidly and accurately. An efficient viewer would be one having a rendered representation of the digital data that takes less time and cognitive effort to perceive and use. Illustrated in FIG. 1 is an implementation of an efficient viewer the uses visually efficient digital objects such as glyphs and intuitive placement of the glyphs that portrays relations between the data entities represented by the glyphs.

As can be seen in FIG. 1, a digital display 100 is displaying a rendered portrayal of a plurality of nodes (sometimes referred to herein as "data entities") 111 in a tree 102 that have been retrieved from a computer database. In the present example, the tree 102 maps relationships, which may be familial or other relationship status, between all of the nodes (data entities) 111 illustrated in the figure. The connectors 106 connecting the nodes (data entities) 111 represent relation properties between the connected nodes (data entities) 111. In the implementation, a root data entity 101 may be selected and may form the origin for the tree 102.

The symbols that represent data entities as nodes 111 and the labels that represent types of relationships (edges) may be formed from words in natural language. For example, the 3-tuple 'John gender male' could represent a person 'John,' the concept 'male,' and the type of relation between them 'gender.' Alternatively, relations can be represented by other kinds of ideograms including pictograms, icons, glyphs, or by showing these in different colors or sizes, or other differentiations, to name a few. The symbols can convey information from the model without drawing a relation. For example, a blue square could represent the relation between a person and their gender where gender is 'male,' and a red circle could represent gender: 'female.' Symbols can be selected that convey information to the viewer in less space and with faster and easier recognition than words.

As illustrated in the figure, a user interface 160 may be provided to receive user inputs into the system, such that there may be interaction with the visualization. A user interface 160 may comprise a plurality 162 of selectable variables to influence the rendering of the visualization and the information provided. For example, a user may select a number of iterations to be represented in visualization. In the present example, a number of generations 164 to be rendered may be determined by a user.

As is further illustrated in the figure, a textual graphic may be displayed to a user in response to a user's direct interaction with the visualization in order to provide an enhanced level of efficiency. For example, direct user interaction with the visualization may come in form providing a listener sub-program that will identify curser activity relative to nodes and edges in the rendered tree such that when activity is sensed textual information may be suppressed, un-suppressed, and/or re-suppressed thereby appearing and then disappearing from the rendering. For example, on a digital display 100 having touch or hover functionality, a user may hover a finger or mouse over a glyph representing node/data entity. A listener sub-program senses the hovering digit or mouse and its location on the screen. In response to the hovering finger or mouse, the listener sub-program causes that the properties corresponding to the data entity who's glyph 148 resides under the hovering finger or mouse to be displayed (or unsuppressed), in a text box 144, over a portion of the rendered tree 102. In order to preserve the efficient portrayal of the tree 102, an embodiment may further cause that the text box 144 disappears after a period of time or when the hovering pointer (whether finger or mouse or otherwise) moves outside the selection area associated with the glyph 148. In an implementation, the text box 148 may stay until another event removes it. Additionally, in an implementation a plurality of text boxes may be shown at the same time.

In an implementation, high level (summary) information can be shown while detail information can be hidden or suppressed (not shown) in an initial view. By selecting a node 111 (or edge) the hidden details can be revealed, thus giving the viewer the control to view the high level information or the detail as desired. The high level view is condensed by showing compact symbols for the nodes 111 and edges, or by hiding details while rendering.

An implementation may comprise an enlarged cursor target area to reduce frustration for some users. The symbols on a rendered chart may be too small to click on or mouse-over with a mouse or fingertip. So the sub-program may draw an invisible rectangle around the symbol thereby providing a larger target. In some state of art rendering technologies the last thing drawn is on top and the top-most object receives the mouse events, overshadowing the lower objects underneath. The invisible rectangle therefore may have to be drawn last.

Figure 2:
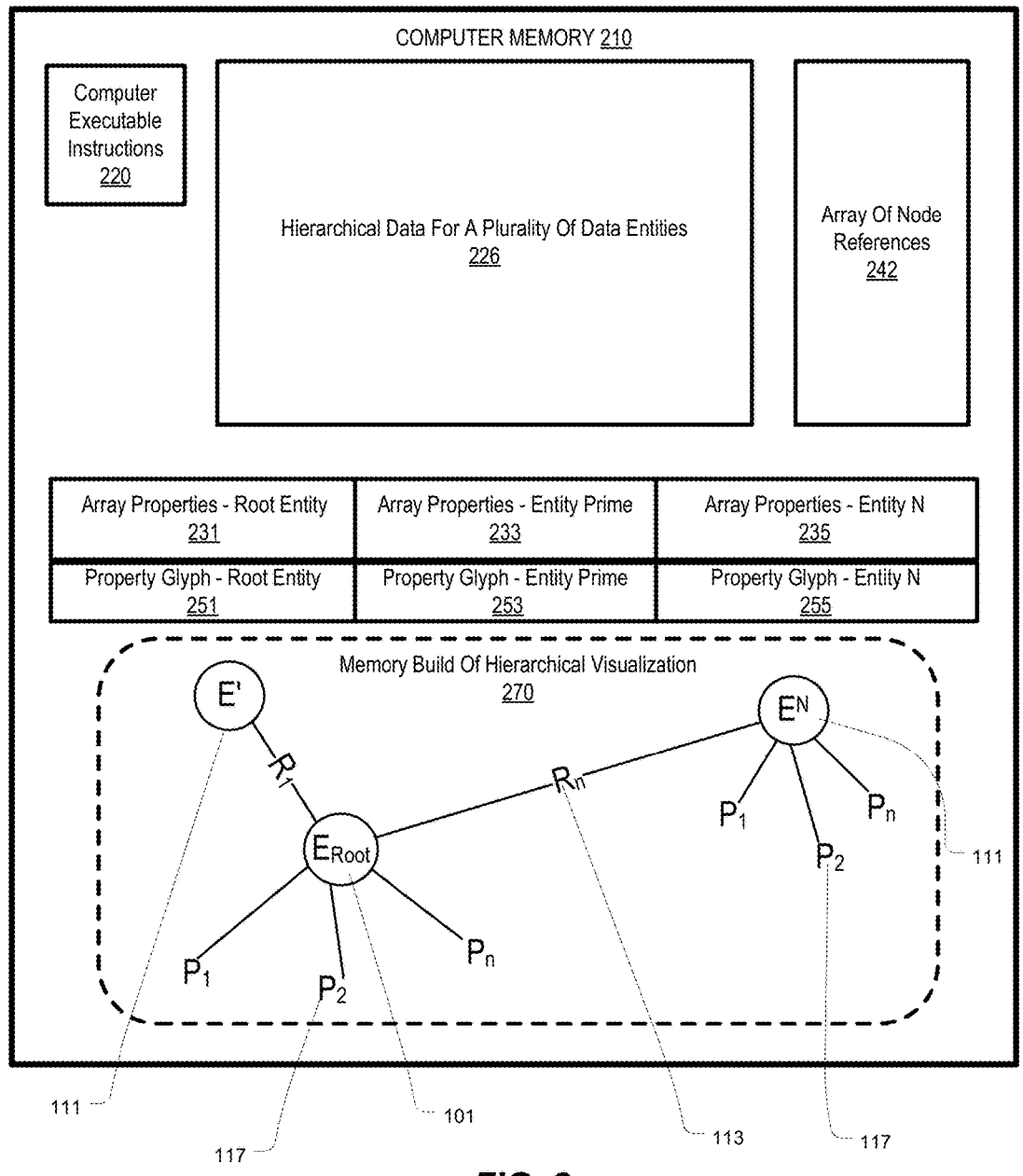
FIG. 2 illustrates a schematic of an embodiment of a suitable computer memory allocation for processing and handling data entities, relations, and properties in accordance with the teachings and principles of the disclosure.

FIG. 2. Illustrates a schematic of an implementation of computing memory and the allocation of associated computing resources within memory and storage during use of the methods disclosed herein. Computer memory 210 within a system for visualizing hierarchal data in a tree form rendering may be schematically allocated as follows. A set of computer executable instructions 220 may be read from computer memory 210 causing computing and networking components associated with the data visualization and data manipulation system to perform the process of receiving into memory allocation 226 for hierarchical data representing a plurality of data entities from a hierarchical database system over a network. Additionally, building memory 270 may be allocated for building a representation of each of the plurality of data entities 111, represented in the hierarchical data, wherein each data entity 111, is represented by a node data structure which contains relationships 113 between data entities 111, properties of interest 117 about each data entity 111, and a root data entity node 101 data structure. The memory may further comprise derived property glyph 251, 253, 255 (glyphs represent entities themselves and/or the properties of entities 231, 233, 235) representing each data entity 111 or a root data entity node 101 data structure based on corresponding properties of interest 117 for each data entity 111 or root date entity node 101 data structure.

Additionally, memory allocation may be configured for receiving a designation of a root data entity 101 from within the hierarchical data 226, and for deriving an array of node references 242 that represent relationships between, and the relations of, the root data entity 101 and other data entities.

Additional memory and resources may be designated for allocating display space for the node references 242 on a digital display and for rendering on the digital display the property glyphs 251, 253, 255 to represent the root data entity 101, properties of the root data entity 101, and the relations of the root data entity 101 for the array of node references 242.

It will be appreciated that there may be tradeoff between number of entities that can be shown and the area or space for display it in a condensed form thereby sacrificing the space required by detailed textual property information; however, as discussed above, the use of pop-up windows may be employed to gain back the detailed textual content.

It should be understood that an efficient and optimized system will dynamically balance showing more entities per unit display space verses showing detail per node for all entities in the chart and showing more detail in mouse over pop-up events. As discussed above, a listener sub-program may be employed to be notified by an underlying operating system when a user selects one of the property glyphs representing each data entity.

In an implementation, a low level view may be achieved by selecting a small number of data entities to render those fewer entities with greater detail. Additionally, a lower level view may also be achieved by zooming into a rendering thereby reducing the number of nodes/data entities that will be represented. A low level or zoomed in view may desirable in some circumstances because it may offer greater details about a single node or small number of nodes and allows more visible detail and interaction among them.

In an implementation, a library such as for example, a D3JS library, may provide for zooming with, scaleExtent, and translate functions that adjust the scale and the x,y position of the drawing based on D3 zoom or pan events, events which D3 receives from the underlying operating system. Exemplary code for zooming and panning may be as follows:

```
function zoom( ) {
    svg.attr("transform", "translate(" + (d3.event.translate[0]) + "," +
(d3.event.translate[1]) + ") rotate(" + rotation + ") scale(" + (dS.event.scale) + ")");
```

```
}
svg.call(d3.behavior.zoom( ).scaleExtent([0.01,10]).translate([left,top]).on("zoom",
    zoom));
```

Figure 3:
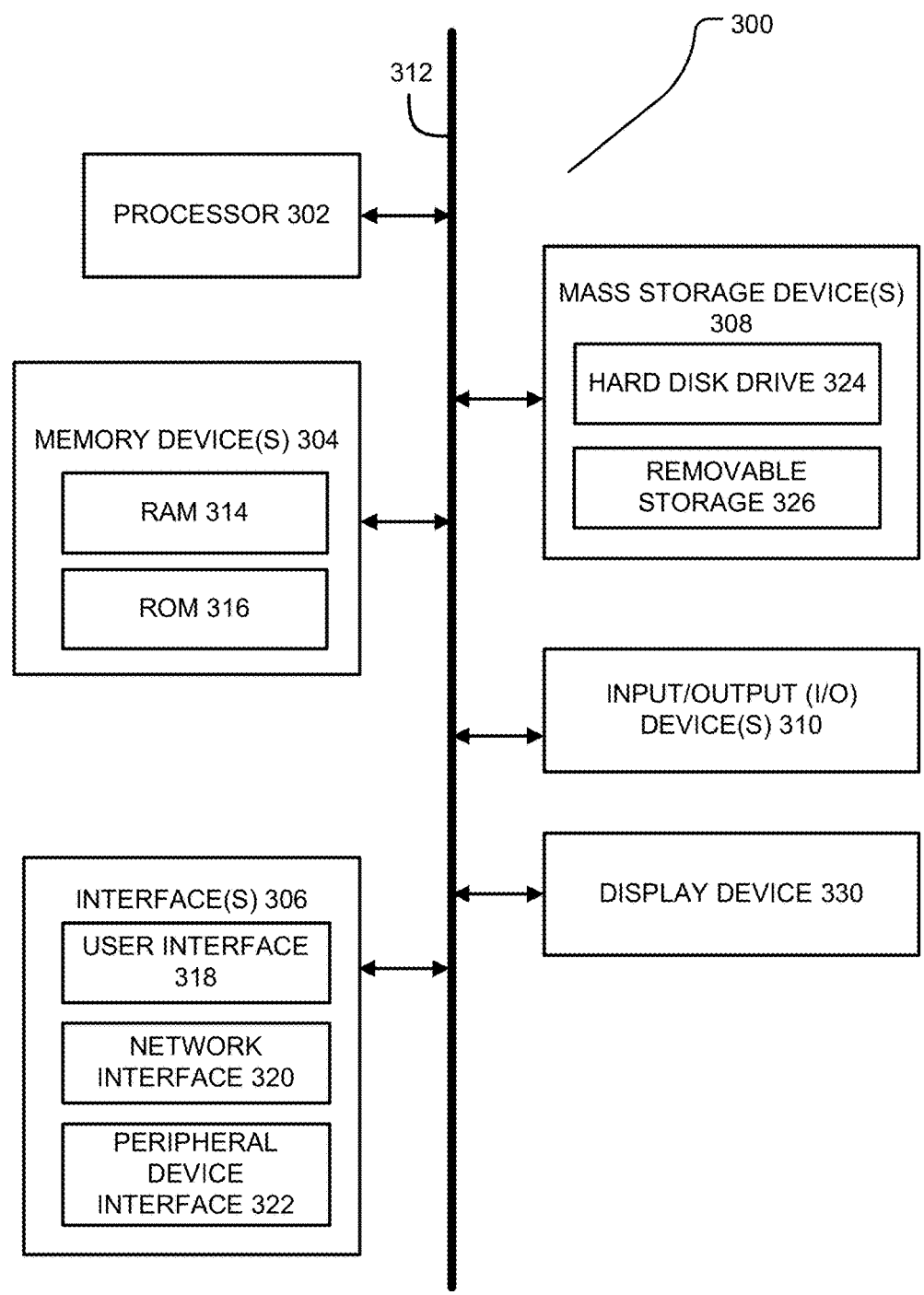
FIG. 3 illustrates an embodiment of computing hardware and resources in accordance with the teachings and principles of the disclosure.

FIG. 3 is a block diagram depicting an example computing device 300 that may be used to implement the methods and systems disclosed herein. In some embodiments, computing device 300 is used to implement one or more of the systems and components discussed herein. For example, computing device 300 may allow a user or administrator to access the condensed hierarchical viewer discussed herein above. Further, computing device 300 may interact with any of the systems and components described herein. Accordingly, computing device 300 may be used to perform various procedures and tasks, such as those discussed herein. Computing device 300 can function as a server, a client or any other computing entity. Computing device 300 can be any of a wide variety of computing devices, such as a desktop computer, a notebook computer, a server computer, a handheld computer, a tablet, and the like.

Computing device 300 includes one or more processor(s) 302, one or more memory device(s) 304, one or more interface(s) 306, one or more mass storage device(s) 308, and one or more Input/Output (I/O) device(s) 310, all of which are coupled to a bus 312. Processor(s) 302 include one or more processors or controllers that execute instructions stored in memory device(s) 304 and/or mass storage device(s) 308. Processor(s) 302 may also include various types of computer-readable media, such as cache memory.

Memory device(s) 304 include various computer-readable media, such as volatile memory (e.g., random access memory (RAM) and/or nonvolatile memory (e.g., read-only memory (ROM)). Memory device(s) 304 may also include rewritable ROM, such as Flash memory.

Mass storage device(s) 308 include various computer readable media, such as magnetic tapes, magnetic disks, optical disks, solid state memory (e.g., Flash memory), and so forth. Various drives may also be included in mass storage device(s) 308 to enable reading from and/or writing to the various computer readable media. Mass storage device(s) 308 include removable media and/or non-removable media.

I/O device(s) 310 include various devices that allow data and/or other information to be input to or retrieved from computing device 300. Example I/O device(s) 310 include cursor control devices, keyboards, keypads, microphones, monitors or other display devices, speakers, printers, network interface cards, modems, lenses, CCDs or other image capture devices, and the like. As discussed above with reference to the user interface 160 of FIG. 1, users can select properties they want to see in the visualization by clicking on a button that is associated with the desired property. The button may toggle on and off, and this controls drawing or not drawing the glyphs corresponding to the property. Turning off a property simplifies the view and makes it easier to see remaining properties that are left on. Accordingly, a visualization may be condensed by selecting less properties, in addition to zoom and pan functionalities that provided through a user interface.

Property selection may also facilitate the rendering speed of the system because retrieving each property across the internet takes time and bandwidth. Sometimes users may prefer to see a smaller set of nodes' properties that will render more quickly, and conversely at other times a user may be willing to wait in order to see a larger set of nodes' properties. In an implementation a user may be granted control over various dimensions as users can select whether they wish to see properties for an entire tree (default), or for a subtree only. Accordingly, to select a subtree the user may select the node at the root of the desired subtree, and then when a user selects certain properties to see, the retrieval will then be limited to the nodes in the subtree, therefore rendering more quickly.

Interface(s) 306 may additionally include various interface types that allow computing devices to interact with other systems, devices, or computing environments using corresponding technologies known in the computing arts. Example interfaces may include any number of different network interfaces, such as interfaces to local area networks (LANs), wide area networks (WANs), wireless networks, and the Internet.

Bus 312 allows processor(s) 302, memory device(s) 304, interface(s) 306, mass storage device(s) 308, and I/O device(s) 310 to communicate with one another, as well as other devices or components coupled to bus 312. Bus 312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 300, and are executed by processor(s) 302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

In addition to providing User-Selectable Properties, the systems disclosed herein may provide organization and storage of the various properties in data structures such as bit-based properties arrays. For example, many properties may be represented with a variety of visual cues such as, colored squares, relative size, glyph shape, etc., all of which occupy space internally in memory during execution. Initially these may be represented as strings (such as 'male', 'died before 16'), which may occupy a lot of memory. Accordingly, to reduce the memory and storage space needed, each property may be represented by a single bit as part of a 32-bit number.

The process of retrieving properties may require many individual calls over a supporting network. Further, the user may request properties for one subset of nodes in a first iteration, and then later request the same properties for a different subset of nodes. These two dynamics may make it necessary to use an additional bit to represent whether the response for a given call has been previously requested and whether it has been received yet or not. During use, the method typically makes repeated calls for every requested property until the bit is set indicating that the response has been received. Thus, in an implementation two bits may be required to improve efficiency, one bit for the property value, and a second bit to represent completion of retrieval for items that may typically require repeated attempts in order to retrieve them.

It should be understood by those in the computing fields, that when representing a large number of properties it may be desirous that more than a single 32-bit number be used for the property, thus multiple 32-bit numbers may be used, either as separate numbers within the node, or as an array of numbers within the node.

Figure 4:
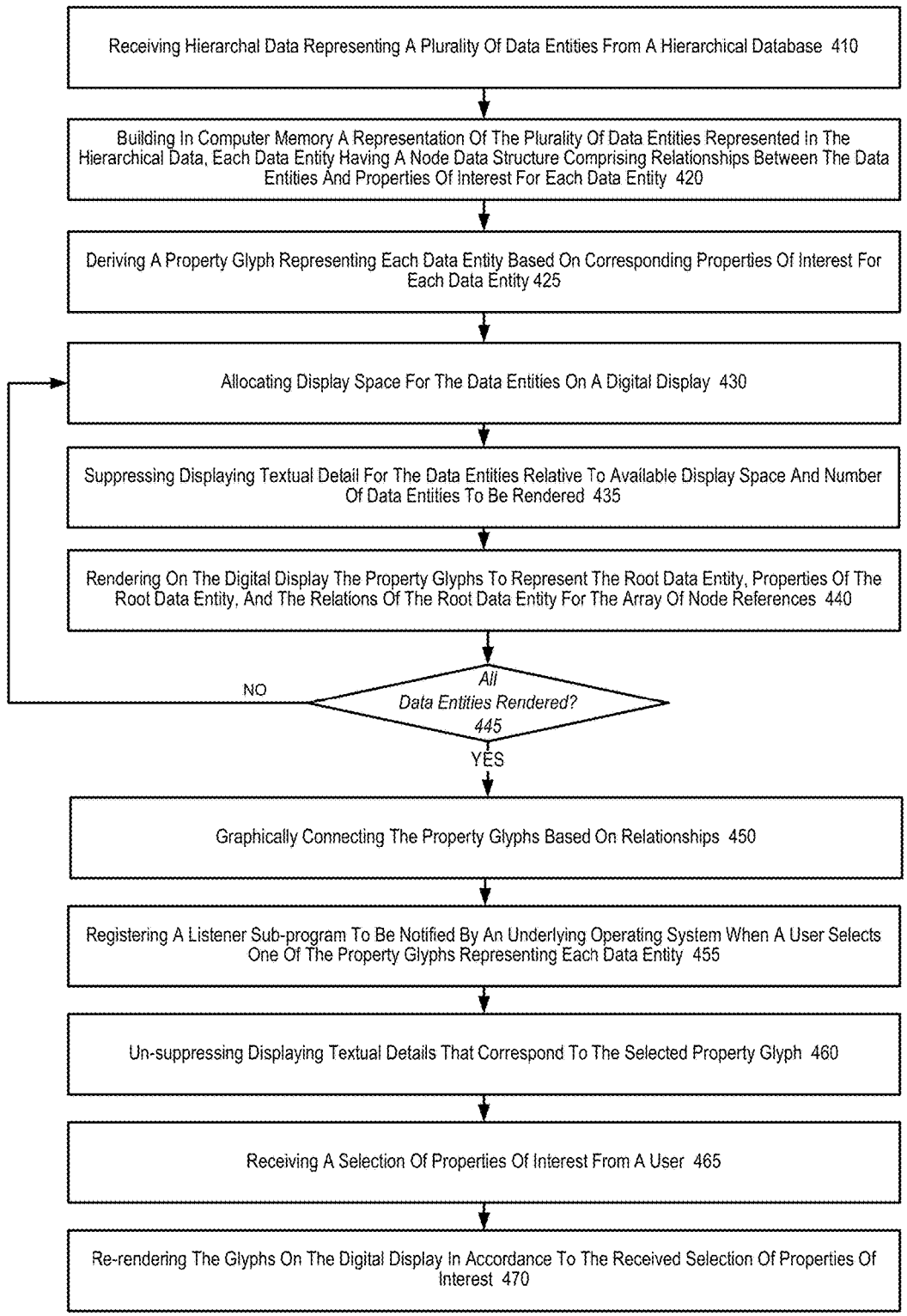
FIG. 4 illustrates a method for visualizing hierarchical data within a computing system in accordance with the teachings and principles of the disclosure.

Referring now to FIG. 4 an implementation for a method for visually rendering hierarchical data in a tree of glyphs as illustrated in FIG. 1 will be discussed. The present implementation is a genealogical implementation wherein the data entities are persons that are related in a definable manner that will be used to provide a hierarchy in the rendered tree. It should be noted, however, that any hierarchical data entities can be used with the methods and systems described herein. Accordingly, during the implementation in the present example, hierarchical data representing a plurality of data entities may be received at 410 and stored in computer memory. The data entities may be received from a single database or from a plurality of databases that are distributed over a network. In an implementation the tree may be represented in memory, for example, as a set of javascript objects (JSON objects) called nodes. A typical node may comprise the following property elements that describe and represent a plurality of unique data entities:

1. ID,
2. Name,
3. Gender,
4. Birth year,
5. Death year,
6. Birthplace,
7. Deathplace,
8. Parents: an array of references to other nodes representing parents or superordinate entities.
9. Children: an array of references to other nodes representing children or offspring or subordinate concepts.
10. Properties: a number or group of numbers used to hold binary bits representing the absence or presence of a property.

In an implementation, where parents consist of a father and mother, the father is in parents[0] and the mother is in parents[1]. In genealogical applications there may be differing opinions as to who is the mother or father, or there may be adoption or other types of parental relationships besides the two-parent biological relationship. In such cases, the array holds as many references to as many parents as necessary. The parents and children arrays support two different hierarchical views, which for the genealogical case include ancestors and descendants. Additionally, children may be typically ordered in ascending order of birth year or they may be ordered by any other ordinal or quantitative property. The algorithm for displaying these is the same in either case. In an alternative rendering, the display could show both ancestor and descendant hierarchies in the same view by allocating the top portion to one and the bottom portion to the other, or left and right sides, etc.

At 420, building in computer memory a representation of the plurality of data entities represented in the hierarchical data, each data entity having a node data structure comprising relationships between the data entities and properties of interest for each data entity. An implementation of a family tree, detailed APIs and documentation may be provided that enables the system to implement the required retrieval interactions, and once the data is retrieved it can be used to populate the memory representation described above.

At 425, deriving a property glyph representing each data entity based on corresponding properties of interest for each data entity. As discussed above, properties may be represented with a variety of visual cues such as, colored squares, relative size, glyph shape, etc., all of which occupy space internally in memory during execution. Initially these may be represented as strings, or may be represented by a single bit as part of a 32-bit number.

In the implementation, with the data entities known and the desired properties selected, the process of allocating display space for the data entities on a digital display may be performed at 430, and in order to maximize the available display space, at 435 the process of suppressing the displaying of all or some textual detail for the data entities, or root data entities, relative to available display space and number of data entities to be rendered is performed. It will be appreciated that even though the textual property data has been suppressed it is still available to be displayed if the user so desires.

The process of rendering on a digital display the property glyphs to represent the root data entity, properties of the root data entity, and the relations of the root data entity for the array of node references is performed at 440. At 445, the processes of allocating and rendering may be repeated until all of the data entities have been rendered on the display. At 450, as part of the rendering of the tree, all of the data entities may be connected graphically according to the hierarchy of the data and based on the relationships to other data entities within the rendered tree.

Figure 8:
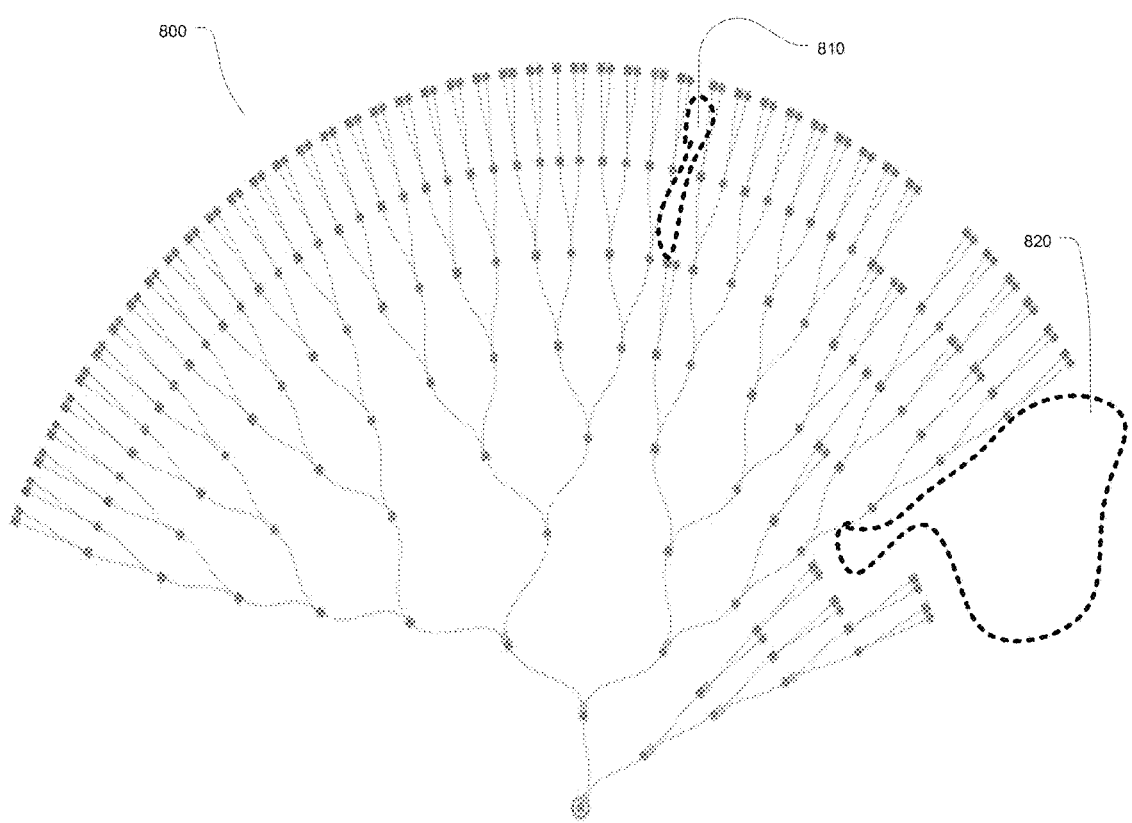
FIG. 8 illustrates an implementation of a hierarchical tree for visualizing hierarchical data within a computing environment and illustrating areas that need additional data in accordance with the teachings and principles of the disclosure.

At 450, the process of registering a listener sub-program will be performed to be notified by an underlying operating system of selections made by a user, and then un-suppressing the displaying of textual details that correspond to the selected property glyph 460. In an implementation, a listener sub-program may be attached to each enlarged mouse target to toggle the showing or hiding of textual details pertaining to the corresponding node. The operating system calls the listener on 'click', 'mouseover', and 'mouseout' events in response to user mouse activity. The textual detail may be shown in a popup dialog near the target as illustrated in FIG. 8.

As discussed above, the textual detail may include information that identifies the node such as name, id, birth and death information. In addition it may show actions that can be performed on the selected node such as viewing the entity in a different view or viewing various properties. Available actions are represented by buttons or other interactive elements which the user may click to fire the corresponding action.

Additionally, the mouseover event may cause the textual detail to appear, while the mouseout causes it to disappear. This allows panning the mouse over the entire view which causes textual detail dialogs to appear and disappear automatically while panning, thus affording to the user to rapidly scan textual information in the view. When the user desires to click on or select the available actions in the detail text dialog it becomes necessary to freeze the dialog such that it does not disappear. This is invoked by the user via the click event. The click event also shows the textual detail dialog but it also disables the mouseout behavior, causing the dialog to remain visible so that the user can move their mouse into the dialog and click on the buttons or other interactive elements in the dialog. The textual details dialog includes a close button to close the dialog and return to the mouseout-active mode. Also, clicking on a different node causes the prior node's dialog to close and the new node's dialog to be displayed.

Touch-only devices such as smart phones and tablets do not ordinarily support mouseover and mouseout events, so these events are not enabled on such devices. This means that users of these devices have only the click event to show the textual details and the either the close button in the dialog to close it or clicking on a different node to show that node's dialog.

In a small-screen environment such as a smart phone or tablet, the limited space on the screen creates a requirement to carefully position the textual details dialog on the screen so as to not obscure the target glyphs in the area where the user is currently looking, so they can click on nearby neighbors of possible interest. The method for doing this is to determine which quadrant of the display contains the selected node, then position the dialog near the node, oriented between the selected node and the most distant opposite corner of the display.

Exemplary code that positions the dialog text may be:

representations of the same information were used, hence the information is condensed. When the user wishes to see details of a selected descendant in textual or other more-detailed representation the user moves the mouse pointer (or other suitable pointing indicator) over the corresponding glyph which causes the textual details to pop-up and appear beside the glyph until the pointer is moved somewhere else, at which point the popup disappears. An implementation of the system 500 may access or comprise a plurality of databases 520, 522, 524 that are part of a distributed network of relational databases 555. It will be appreciated by those skilled in the art that databases may be relational, hierarchical, networked, no-SQL database or any other kind of database currently known or yet to be discovered. Additionally, data used by the system may be contained in any kind of file format such as, for example, a GEDCOM file, or even a spreadsheet.

Figure 6:
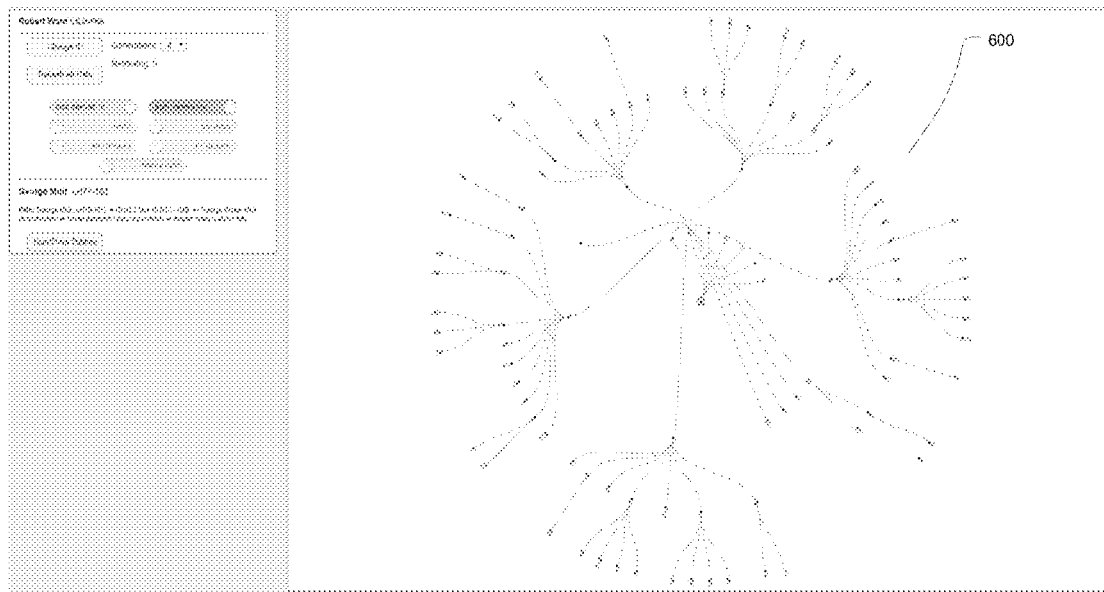
FIG. 6 illustrates an implementation of a hierarchical tree for visualizing hierarchical data within a computing environment in accordance with the teachings and principles of the disclosure.
Figure 7:
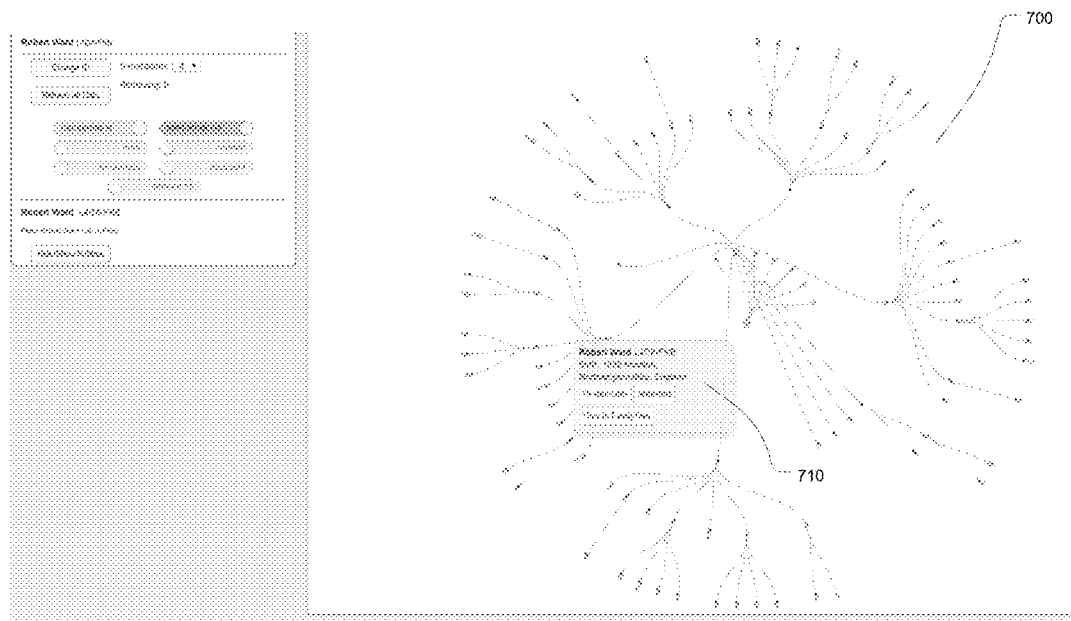
FIG. 7 illustrates an implementation of a hierarchical tree for visualizing hierarchical data within a computing environment with an unsuppressed text box in accordance with the teachings and principles of the disclosure.

FIG. 6 and FIG. 7 illustrate a genealogical descendant and/or ancestral trees 600, 700 using the condensed viewer disclosed herein. FIG. 7 illustrates an implementation of textual details in a popup 710 beside one selected glyph representing the selected descendant. The popup 710 appears when the user's pointer moves over a glyph, and it disappeared when the pointer was moves away from a glyph.

```
    var spacing = 30;
    var idWidth = $identityDialog.width( ) + 20;//+border+padding
    var idx = event.layerX > left ? event.clientX – idWidth – spacing : event.clientX + spacing;
    var idHeight = $identityDialog.height( ) + 20;//+border+padding
    var idy = event.layerY > top ? event.clientY – idHeight – spacing : event.clientY + spacing;
       if (idx < 15) idx = 15;
       var winWidth = window.viewportSize.getWidth( );
       var winHeight = window.viewportSize.getHeight( );
       if ((idx + idWidth) > (winWidth – 10)) idx = winWidth – 10 – idWidth;
       if ((idy + idHeight) > (winHeight – 8)) idy = winHeight – 8 – idHeight;
       $identityDialog.css("left", idx).css("top", idy).css('border','2px solid #ddd').show( );
    ]
```

At 465, a selection of properties of interest may be received thereby causing the re-rendering the glyphs on the digital display in accordance to the received selection of properties of interest at 470, thereby allowing a user to modify the rendering as desired.

Figure 5:
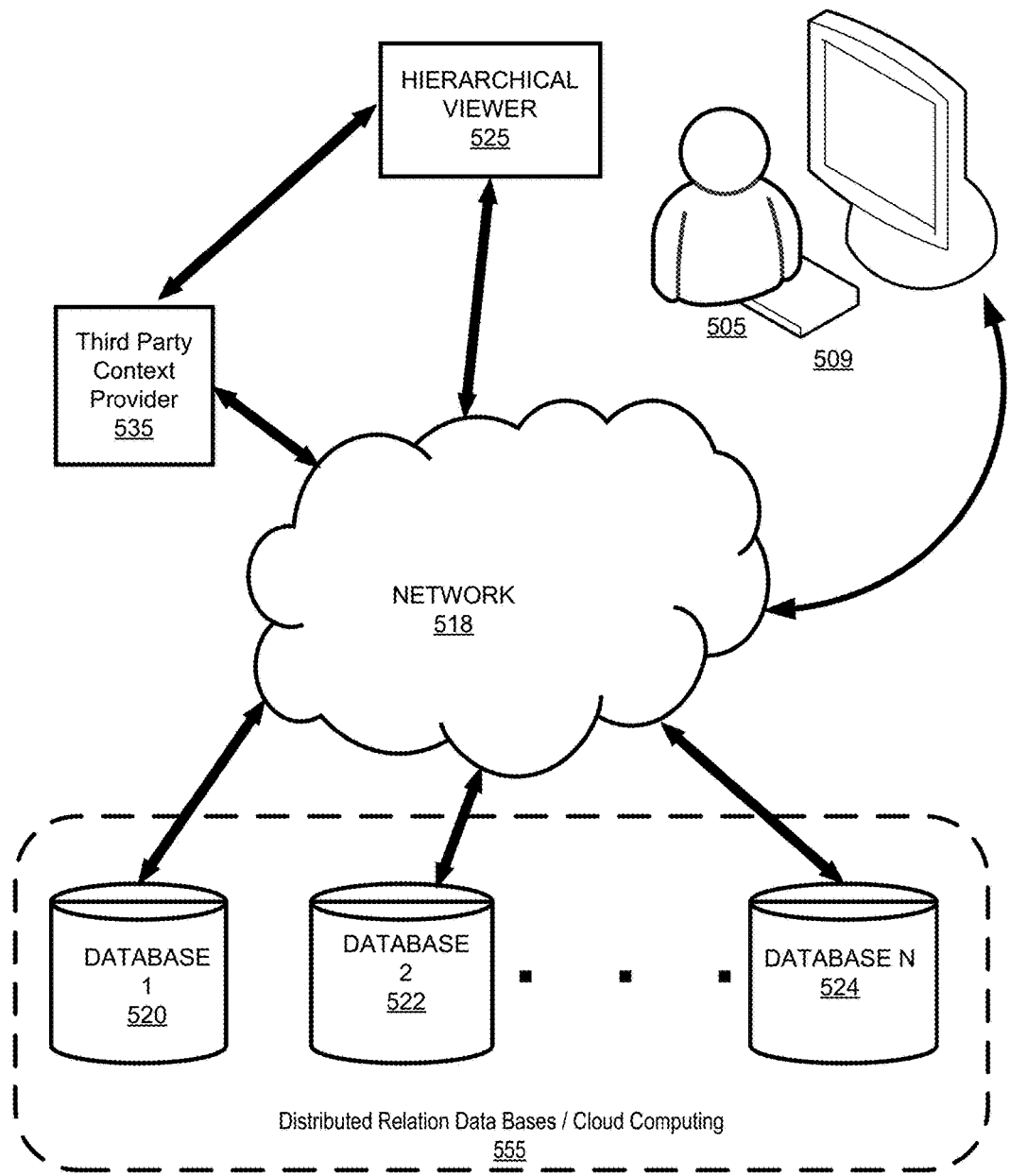
FIG. 5 illustrates a distributed system for visualizing hierarchical data within a computing environment in accordance with the teachings and principles of the disclosure.

Referring primarily to FIG. 5 and secondarily to FIG. 6 and FIG. 7, there is illustrated an embodiment of a computing system 500 and environment for providing a condensed hierarchical viewer 525 that provides interactive computer-based visualization of the genealogical descendants of a person, animal, plant or other deeply-nested and many-branched hierarchical associations to include many generations in a condensed format. The system 500 may comprise a computer 509 having a digital display and connected to a network 518. Additionally, the system may utilize a third party context provider 535 which may comprise proprietary and non-proprietary data that has been formatted or dedicated to a primary purpose. For example, a third party context provider may be genealogically focused, and may provide data that has been securely generalized to protect the data entities that make up the contextual data it provides to the system 500.

As discussed above, hierarchical viewer 525 may comprise a database of glyphs, shapes, or other symbols to denote properties of each descendant instead of textual representations of these details so that a larger number of descendants can be viewed than would be possible if textual In this view, the glyphs may represent human descendants or ancestors of the person drawn at the center. In the implementation, a square may be a glyph representing males. A circle glyph may represent females. Lines drawn between these are glyphs may represent parent-child relationships. Other attached glyphs may depict other properties, such as yellow squares which indicate persons who may have died young, or gray squares which may indicate persons who were born within the past 110 years, but any scheme of glyphs or symbols may be used to depict any properties of interest and these are provided merely as an example.

The viewer 525 may be implemented in any computer system 500 capable of: (1) drawing glyphs and text on a computer viewing device such as a monitor, tablet, smart phone or other display, and (2) receiving user input from a mouse, touch-sensitive surface, video tracker or other pointing device. The system 500 may be programmed in any programming language that supports these same capabilities. In the preferred embodiment the computer system 500 is a web browser and the programming language is a combination of HTML/jade pages, javascript, the D3JS Javascript Visualization Library, the jQuery javascript library, and cascading style sheets (css), though any other similarly capable library(s) and visual rendering system may be used.

The program receives hierarchical genealogical data from any suitable genealogical database system (such as 555, and/or 535) and builds an internal representation in memory of each person to be drawn by the viewer 525. In an implementation, each person or data entity is represented by a node data structure, which contains the properties of interest about the person and a reference to the glyphs drawn within the underlying windowing/browser operating system. Each node also contains an array of references to other nodes representing that person's children or descendants or hierarchical sub-associates. To produce a descendants view the system 500 traverses the nodes from the beginning person, allocates display space, draws the desired glyphs to represent the person and relationships, then visits each child in the accompanying array repeating the same procedure to render each descendant generation until all of the data entities are drawn and/or rendered.

To make the textual details appear, the system 500 may register a listener sub-program to be notified by the underlying windowing/browser operating system when the user moves the pointer over a glyph (mouseover or hover over event). When notification is received the system 500 draws the desired textual or other detail view (pop up 710) near the selected glyph based on the information in the node. Similarly, the system 500 may also register a listener to be notified when the user moves the pointer away from the glyph (mouseout event), and when notified, the system 500 hides or deletes the view (pop up 710) of the textual details.

FIG. 8 illustrates an implementation of a hierarchical rendering 800 of data entities that further identifies data entity shortfalls 810 and 820 which are shown in dashed lines.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

In the foregoing Detailed Description, various features of the disclosure are grouped together in a single implementation for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed implementation. Thus, the following claims are hereby incorporated into this Detailed Description by this reference, with each claim standing on its own as a separate implementation of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method for visualizing generational data within a computing system comprising:
   receiving, using a computing processor, generational data representing a plurality of generationally-related data entities from a generational database system over a network;
   building in computer memory a representation of each of the plurality of data entities represented in the generational data, wherein each data entity is represented by a node data structure within computer memory, which contains relationships between data entities and properties of interest about each data entity;
   deriving a property glyph representing each data entity, including a root data entity, based on corresponding properties of interest for each data entity;
   receiving a designation of the root data entity from within the generational data;
   allocating display space for the property glyphs and a root data entity node data structure on a digital display based on the designated root data entity;
   rendering on the digital display:
      the root data entity property glyph that represents the root data entity,
      properties of interest for the root data entity,
      the root data entity node data structure,
      a graphical representation identifying a generational relationship in a non-textual manner between the root data entity and one or more of the plurality of data entities, wherein the one or more of the plurality of data entities in the same generation include no graphical connection,
      one or more data entity shortfalls in generational relationships between one or more of the plurality of data entities and,
   in response to user interaction, suppressing the display of all textual data for the root data entity node data structure relative to available display space and number of data entities to be rendered;
   rendering other derived property glyphs until all of the derived property glyphs are displayed on the digital display and graphically connecting the derived property glyphs for each of the plurality of data entities based on generational relationships identified in the node data structures for each of the data entities.

2. The method of claim 1, further comprising:
   registering a listener sub-program to be notified by an underlying operating system when the user interaction comprises at least selecting, by the user, one of the property glyphs representing each data entity; and
   displaying textual details that correspond to the selected property glyph.

3. The method of claim 2, further comprising: stopping the displaying of textual details when the user deselects the glyph.

4. The method of claim 3, wherein user interaction is a mouse-out event.

5. The method of claim 2, wherein user interaction is a mouse-over event.

6. The method of claim 1, wherein the generational data is genealogical.

7. The method of claim 1, further comprising: displaying the property glyph of the root data entity at the center of a substantially circular rendering that comprises property glyphs representing relatives of the root data entity that radiate out from the glyph of the root data entity forming the circular rendering.

8. The method of claim 1, wherein the generational relationships include descendants of the root data entity.

9. The method of claim 1, wherein the generational relationships include ancestors of the root data entity.

10. The method of claim 1, wherein the generational relationships include both ancestral and descendant.

11. The method of claim 1, wherein a rendered dimension of the glyph is dependent on a number of relations to be displayed.

12. The method of claim 1, further comprising:
receiving a selection of properties of interest from a user; and
re-rendering the glyphs on the digital display in accordance to the received selection of properties of interest.

13. The method of claim 1, wherein the properties of interest further comprise at least one of age, gender, familial relation, genotypes, phenotypes, marital status, birth date, death date, birth place, death place, possible duplicate records, religious ordinance status, hints, and sources of information.

14. The method of claim 1, further comprising: graphically highlighting a series of generational relationships between glyphs that traverses from the root data entity to any other entity.

15. The method of claim 1, wherein the properties of interest are represented by a color of the glyph.

16. The method of claim 1, wherein the properties of interest are represented by a shape of the glyph.

17. The method of claim 1, wherein the properties of interest are represented by a size of the glyph.

18. The method of claim 1, further comprising zooming.

19. The method of claim 1, further comprising panning.

20. The method of claim 1, wherein the generational data is hierarchical and organizational.

21. A system for visualizing generational data within a computing environment comprising memory, computer storage, and computing processors, wherein computer readable instructions are stored in the memory, and the computer readable instructions are retrieved from memory and executed by the computing processors, cause the system to:
receive generational data representing a plurality of generational-related data entities from a generational database system;
build in computer memory a representation of each of the plurality of data entities represented in the generational data, wherein each data entity is represented by a node data structure within computer memory, which contains relationships between data entities and properties of interest about each data entity;
derive a property glyph representing each data entity, including a root data entity, based on corresponding properties of interest for each data entity;
receive a designation of the root data entity from within the generational data;
allocate display space for the property glyphs and a root data entity node data structure on a digital display based on the designated root data entity;
render on the digital display:
the root data entity property glyph that represents the root data entity,
properties of interest for the root data entity,
the root data entity node data structure,
a graphical representation identifying a generational relationship between the root data entity and one or more of the plurality of data entities, wherein the one or more of the plurality of data entities in the same generation include no graphical connection,
one or more data entity shortfalls in generational relationships between one or more of the plurality of data entities and,
in response to user interaction, suppressing the display of all textual data for the root data entity node data structure relative to available display space and number of data entities to be rendered;
render other derived property glyphs until all of the derived property glyphs are displayed on the digital display and graphically connecting the derived property glyphs for each of the plurality of data entities based on generational relationships identified in the node data structures for each of the data entities.

22. The system of claim 21, further comprising:
register a listener sub-program to be notified by an underlying operating system when the user interaction comprises at least selecting, by the user, one of the property glyphs representing each data entity; and
display textual details that correspond to the selected property glyph.

23. The system of claim 22, further comprising: stop the displaying of textual details when the user deselects the glyph.

24. The system of claim 23, wherein user interaction is a mouse-out event.

25. The system of claim 22, wherein user interaction is a mouse-over event.

26. The system of claim 21, wherein the generational data is genealogical.

27. The system of claim 21, further comprising: display the property glyph of the root data entity at the center of a substantially circular rendering that comprises property glyphs representing relatives of the root data entity that radiate out from the glyph of the root data entity forming the circular rendering.

28. The system of claim 21, wherein the generational relationships include descendants of the root data entity.

29. The system of claim 21, wherein the generational relationships include ancestors of the root data entity.

30. The system of claim 21, wherein the generational relationships include both ancestral and descendant.

31. The system of claim 21, wherein a rendered dimension of the glyph is dependent on a number of relations to be displayed.

32. The system of claim 21, wherein the properties of interest further comprise at least one of age, gender, familial relation, genotypes, phenotypes, marital status, birth date, death date, birth place, death place, possible duplicate records, religious ordinance status, hints, and sources of information.

33. The system of claim 21, wherein the generational data is organizational.

* * * * *